United States Patent
Tsai

(10) Patent No.: US 11,370,715 B2
(45) Date of Patent: Jun. 28, 2022

(54) CONCRETE HARDENER COMPOSITION

(71) Applicants: Floriss Chroma Ltd., Taipei (TW); Chen-Yang Tsai, Taoyuan (TW)

(72) Inventor: Chen-Yang Tsai, Taoyuan (TW)

(73) Assignees: Floriss Chroma Ltd., Taipei (TW); Chen-Yang Tsai, Taoyuan (TW)

( * ) Notice: Subject to any disclaimer, the term of this patent is extended or adjusted under 35 U.S.C. 154(b) by 26 days.

(21) Appl. No.: 17/178,209

(22) Filed: Feb. 17, 2021

(65) Prior Publication Data

US 2021/0284584 A1 Sep. 16, 2021

(30) Foreign Application Priority Data

Mar. 11, 2020 (TW) ................................ 109107981

(51) Int. Cl.
| | |
|---|---|
| C04B 40/00 | (2006.01) |
| C04B 12/04 | (2006.01) |
| C04B 24/06 | (2006.01) |
| C04B 24/16 | (2006.01) |
| C04B 24/12 | (2006.01) |
| C04B 24/42 | (2006.01) |
| C04B 24/04 | (2006.01) |
| C04B 24/32 | (2006.01) |
| C04B 22/08 | (2006.01) |
| C04B 103/40 | (2006.01) |
| C04B 103/14 | (2006.01) |

(52) U.S. Cl.
CPC .......... *C04B 40/0039* (2013.01); *C04B 12/04* (2013.01); *C04B 22/082* (2013.01); *C04B 24/04* (2013.01); *C04B 24/06* (2013.01); *C04B 24/123* (2013.01); *C04B 24/16* (2013.01); *C04B 24/32* (2013.01); *C04B 24/42* (2013.01); *C04B 2103/14* (2013.01); *C04B 2103/402* (2013.01); *C04B 2103/406* (2013.01)

(58) Field of Classification Search
CPC . C04B 12/04; C04B 22/0013; C04B 22/0066; C04B 22/062; C04B 22/064; C04B 22/082; C04B 22/085; C04B 22/10; C04B 24/02; C04B 24/04; C04B 24/06; C04B 24/16; C04B 24/123; C04B 24/283; C04B 24/32; C04B 24/42; C04B 28/02; C04B 28/26; C04B 40/0039; C04B 40/0295; C04B 41/009; C04B 41/68; C04B 41/5089; C04B 41/46; C04B 41/4927; C04B 41/5016; C04B 2103/0007; C04B 2103/0008; C04B 2103/14; C04B 2103/402; C04B 2103/406; C04B 2111/00482

See application file for complete search history.

(56) References Cited

U.S. PATENT DOCUMENTS

| | | | | |
|---|---|---|---|---|
| 1,899,576 | A | * | 2/1933 | Lemmerman ........... C04B 40/04 264/79 |
| 4,203,773 | A | * | 5/1980 | Temple ................ C04B 20/1051 106/606 |
| 6,454,632 | B1 | | 9/2002 | Jones |
| 8,852,334 | B1 | | 10/2014 | Hills |
| 9,073,165 | B2 | | 7/2015 | Wetherell |

FOREIGN PATENT DOCUMENTS

| | | | | | |
|---|---|---|---|---|---|
| CN | 101407428 | A | * | 4/2009 | ........... C04B 41/009 |
| CN | 102503347 | | | 6/2012 | |
| CN | 103864341 | A | * | 6/2014 | ............. C04B 24/42 |
| CN | 105036593 | | | 11/2015 | |
| CN | 105800984 | | | 7/2016 | |
| CN | 106146035 | A | * | 11/2016 | ............. C04B 40/02 |
| CN | 107954624 | A | * | 4/2018 | ............. C04B 24/02 |
| JP | 50-9634 | A | * | 1/1975 | ............. C04B 28/24 |
| JP | 4535723 | | | 9/2010 | |
| KR | 10-0502243 | B1 | * | 9/2003 | ............. C04B 28/02 |
| WO | 2009/016230 | | | 2/2009 | |
| WO | 2010/026155 | | | 3/2010 | |

* cited by examiner

*Primary Examiner* — Anthony J Green
(74) *Attorney, Agent, or Firm* — Winston Hsu

(57) ABSTRACT

Provided is a concrete hardener composition. The concrete hardener composition includes a sodium silicate compound, an acid compound and a balance amount of solvent. The sodium silicate compound includes sodium silicate or a mixture of sodium silicate and sodium methylsilicate. The acid compound includes acetic acid, glycolic acid, ethylenediaminetetraacetic acid, tartaric acid, nitric acid, boric acid or a combination thereof. The solvent includes water or a mixed solution of water and polyol. Based on the total weight of the concrete hardener composition, the content of silicon is between 5 wt % and 15 wt %, and the content of the acid compound is between 2 wt % and 30 wt %.

10 Claims, No Drawings

CONCRETE HARDENER COMPOSITION

CROSS REFERENCE TO RELATED APPLICATION

This application claims the priority benefit of Taiwan application serial no. 109107981, filed on Mar. 11, 2020. The entirety of the above-mentioned patent application is hereby incorporated by reference herein and made a part of this specification.

BACKGROUND OF THE INVENTION

1. Field of the Invention

The invention relates to a concrete hardener composition.

2. Description of the Prior Art

Cement is a kind of building material, which may be hardened when mixed with water. In existing building structures, concrete is often used as the substrate material. Concrete is mainly prepared by mixing cement, sand and water, and then a concrete substrate is formed after curing.

The concrete substrate is a porous substrate. When the concrete substrate is exposed to the air, chloride ions, water, carbon dioxide and acid substances may penetrate into the pores of the concrete substrate and corrosion is occurred, resulting in cracks in the concrete, thereby reducing the mechanical strength, such as surface hardness, of the concrete substrate. When the concrete substrate is further deteriorated, peeling of the concrete substrate may be occurred, which may lead to a high risk of building safety issues. In addition, when the concrete substrate is used on the ground, the concrete substrate is trended to be abraded by an object movement and heavy pressure due to the poor surface hardness of the concrete substrate. Therefore, the issue of how to effectively improve the mechanical strength of the concrete substrate has been highly valued.

SUMMARY OF THE INVENTION

The present invention provides a concrete hardener composition, which can make the concrete substrate have a higher surface density and good mechanical strength.

A concrete hardener composition of the present invention includes a sodium silicate compound, an acid compound and a balance of solvent. The sodium silicate compound includes sodium silicate or a mixture of sodium silicate and sodium methylsilicate. The acid compound includes acetic acid, glycolic acid, ethylenediaminetetraacetic acid, tartaric acid, nitric acid, boric acid or a combination thereof. The solvent includes water or a mixed solution of water and polyol. Based on the total weight of the concrete hardener composition, the content of silicon is between 5 wt % and 15 wt %, and the content of the acid compound is between 2 wt % and 30 wt %.

In an embodiment of the concrete hardener composition of the present invention, the content of the sodium methylsilicate is not more than 10 wt % based on the total weight of silicate in the concrete hardener composition.

In an embodiment of the concrete hardener composition of the present invention, the content of the solvent is between 30 wt % and 78 wt % based on the total weight of the concrete hardener composition In an embodiment of the concrete hardener composition of the present invention, the content of water is between 50 wt % and 100 wt % based on the total weight of the solvent.

In an embodiment of the concrete hardener composition of the present invention, the total water component in the concrete hardener composition comprises water of crystallization contained in the silicate in the concrete hardener composition.

In an embodiment of the concrete hardener composition of the present invention, a lithium-containing compound, a potassium-containing compound or a combination thereof is further included, wherein the content of lithium ions in the lithium-containing compound does not exceed 1 wt % and the content of potassium ions in the potassium-containing compound does not exceed 6 wt % based on the total weight of the concrete hardener composition.

In an embodiment of the concrete hardener composition of the present invention, the lithium-containing compound comprises lithium silicate, lithium carbonate, lithium hydroxide or a combination thereof.

In an embodiment of the concrete hardener composition of the present invention, the potassium-containing compound comprises potassium silicate, potassium methylsilicate, potassium carbonate, potassium hydroxide or a combination thereof.

In an embodiment of the concrete hardener composition of the present invention, the polyol comprises glycerin, ethylene glycol, propylene glycol, diethylene glycol, glycerol polyoxyethylene ether, polyethylene glycol or a combination thereof.

In an embodiment of the concrete hardener composition of the present invention, a surfactant is further included, wherein the content of the surfactant is not more than 0.5 wt % based on the total weight of the concrete hardener composition.

Based on the above, in the concrete hardener composition of the present invention, since sodium silicate or a mixture of sodium silicate and sodium methylsilicate and an acid compound are contained, the content of silicon is between 5 wt % and 15 wt % and the content of the acid compound is between 2 wt % and 30 wt %, the surface density and mechanical strength (such as surface hardness) of the concrete substrate may be effectively improved to meet the needs of current building materials.

To make the aforementioned more comprehensible, several embodiments are described in detail as follows.

These and other objectives of the present invention will no doubt become obvious to those of ordinary skill in the art after reading the following detailed description of the preferred embodiment that is illustrated in the various figures and drawings.

DETAILED DESCRIPTION

In the text, the terms mentioned in the text, such as "comprising", "including" and "having" are all open-ended terms, i.e., meaning "including but not limited to".

In addition, in the text, the range represented by "a value to another value" is a summary expression way to avoid listing all the values in the range one by one in the specification. Therefore, the record of a specific numerical range covers any numerical value within the numerical range, as well as a smaller numerical range defined by any numerical value within the numerical range.

After the concrete is applied and cured to form a concrete substrate, a concrete hardener containing the concrete hardener composition of the present invention may be coated on the surface of the concrete substrate. Since the concrete hardener composition of the present invention contains a sodium silicate compound, such as sodium silicate or a mixture of sodium silicate and sodium methylsilicate, water-insoluble crystals with high hardness may be formed in the pores of the concrete substrate after the concrete hardener composition is coated, thereby improving the surface density and surface hardness of the concrete substrate. As a result, the safety may be improved when the concrete substrate is applied to the building structure. The concrete hardener composition of the present invention will be described in detail below.

The concrete hardener composition of the present invention mainly contains (A) sodium silicate compound, (B) acid compound and (C) a balance of solvent. In addition, depending on actual needs, the concrete hardener composition of the present invention may further include (D) additives.

(A) Sodium Silicate Compound

In the concrete hardener composition of the present invention, the sodium silicate compound contained includes sodium silicate or a mixture of sodium silicate and sodium methylsilicate, which may be solid or aqueous solution, which is not particularly limited in the present invention. That is, in the concrete hardener composition of the present invention, the sodium silicate compound is mainly sodium silicate. Therefore, when the sodium silicate compound is a mixture of sodium silicate and sodium methylsilicate, based on the total weight of the silicate in the concrete hardener composition, the content of sodium methylsilicate is not more than 10 wt %. When the content of sodium methylsilicate is more than 10 wt %, since the content of sodium silicate is too low, the high content of sodium methylsilicate may form a water-repellent layer with the surface of concrete, which causes the hardener subsequently coated to be unable to penetrate into the concrete substrate.

In addition, in the concrete hardener composition of the present invention, the content of silicon is between 5 wt % and 15 wt %. When the content of silicon is less than 5 wt %, the hardening effect may be poor. When the content of silicon is more than 15 wt %, the content of silicon may exceed the saturation concentration, and thus crystallization may be occurred while the temperature is decreased.

When the concrete hardener containing the concrete hardener composition of the present invention is coated on the surface of the concrete substrate, since the sodium silicate or the mixture of sodium silicate and sodium methylsilicate has higher water solubility, sodium silicate or a mixture of sodium silicate and sodium methylsilicate dissolved in water may produce a large amount of silicate ions, and the silicate ions may be interacted with the divalent metal ions in the concrete (such as $Ca^{2+}$, $Mg^{2+}$, $Ba^{2+}$, etc.) and/or trivalent metal ions (such as $Fe^{3+}$, $Al^{3+}$, etc.) to form water-insoluble crystals with high hardness. The formed crystals may fill in the pores at the surface of the concrete to effectively reduce or avoid the corrosion of concrete by external substances (such as chloride ions, water, carbon dioxide, acid substances, etc.) when the concrete is exposed to the air. In other words, the concrete hardener containing the concrete hardener composition of the present invention may effectively increase the density and surface hardness at the surface of the concrete substrate.

(B) Acid Compound

In the concrete hardener composition of the present invention, the acid compound may be an organic acid or an inorganic acid, and may be solid or aqueous solution, which is not particularly limited in the present invention. The acid compound may be acetic acid, glycolic acid, ethylenediaminetetraacetic acid (EDTA), tartaric acid, nitric acid, boric acid or a combination thereof. The acid compound is used to promote the ability of silicate to penetrate into the concrete substrate and combine with the divalent or trivalent metal ions in the concrete substrate.

In the concrete hardener composition of the present invention, based on the total weight of the concrete hardener composition, the content of the acid compound is between 2 wt % and 30 wt %. When the content of the acid compound is less than 2 wt %, the hardener may not effectively penetrate into the concrete substrate and may not combine with the divalent or trivalent metal ions in the concrete substrate, resulting in poor hardness of the concrete substrate. When the content of the acid compound is more than 30 wt %, silica sol may be produced due to too much alkali is neutralized.

In addition, when the acid compound includes acetic acid, the content of acetic acid does not exceed 12 wt % based on the total weight of the concrete hardener composition. When the acid compound includes glycolic acid, the content of glycolic acid does not exceed 12 wt % based on the total weight of the concrete hardener composition. When the acid compound includes ethylenediaminetetraacetic acid, the content of ethylenediaminetetraacetic acid shall not exceed 18 wt % based on the total weight of the concrete hardener composition. When the acid compound includes tartaric acid, the content of tartaric acid does not exceed 10 wt % based on the total weight of the concrete hardener composition. When the acid compound includes nitric acid, the content of nitric acid does not exceed 10 wt % based on the total weight of the concrete hardener composition. When the acid compound includes boric acid, the content of boric acid does not exceed 25 wt % based on the total weight of the concrete hardener composition.

(C) Solvent

In the concrete hardener composition of the present invention, the solvent includes water or a mixed solution of water and polyol. Generally speaking, based on the total weight of the concrete hardener composition, the content of the solvent may be between 30 wt % and 78 wt %. When the content of the solvent is less than 30 wt %, the sodium silicate compound, the acid compound and other additives may not be effectively dissolved. When the content of the solvent is more than 78 wt %, the concrete hardener may not be effectively and uniformly coated on the concrete substrate, and the concentration of the main component in the concrete hardener is too low to achieve a good hardening effect.

In addition, when the solvent is the mixed solution of water and polyol, the content of water is between 50 wt % and 100 wt %. When the content of water is less than 50 wt %, the sodium silicate compound, the acid compounds and other additives may not be effectively dissolved. The polyol may be glycerin, ethylene glycol, propylene glycol, diethylene glycol, glycerol polyoxyethylene ether, polyethylene glycol or a combination thereof.

(D) Additives

In the concrete hardener composition of the present invention, in addition to the (A) sodium silicate compound, (B) acid compound and (C) solvent, (D) additives may be further included.

The additives may be a lithium-containing compound, a potassium-containing compound, a surfactant, etc., which may be solid or aqueous solution. The additives may be used alone or in combination. The additives will be further explained below.

The concrete hardener composition of the present invention may contain a lithium compound. The lithium-containing compound may be lithium silicate, lithium carbonate, lithium hydroxide or a combination thereof. Based on the total weight of the concrete hardener composition, the content of the lithium ions in the lithium-containing compound does not exceed 1 wt %. When the content of the lithium ions in the lithium-containing compound exceeds 1 wt %, the lithium-containing compound may not be dissolved completely.

The concrete hardener composition of the present invention may contain a potassium-containing compound. The potassium-containing compound may be potassium silicate, potassium methylsilicate, potassium carbonate, potassium hydroxide or a combination thereof. Based on the total weight of the concrete hardener composition, the content of the potassium ions in the potassium compound does not exceed 6 wt %. When the content of the potassium ions in the potassium compound exceeds 6 wt %, the penetration effect of the concrete hardener into concrete may be reduced since the atomic radius of the potassium ions is larger than that of the sodium ions.

The concrete hardener composition of the present invention may contain a surfactant. The surfactant may include various well-known surfactants, such as sodium lauryl sulfate, polyoxypropylene polyoxyethylene copolymer, nonylphenol polyoxyethylene ether sulfate sodium salt, etc., but the present invention is not limited thereto. Based on the total weight of the concrete hardener composition, the content of the surfactant does not exceed 0.5 wt %. When the content of the surfactant exceeds 0.5 wt %, the additional effects may not be produced and the cost may be increased.

In addition, in the concrete hardener composition of the present invention, the source of water may include water in the solvent, water of crystallization contained in silicate and water in the aqueous solution of each component. For example, when the sodium silicate compound is a sodium silicate compound containing water of crystallization, water may be generated after the sodium silicate compound is dissolved. The sodium silicate compound containing water of crystallization may be hydrated sodium silicate and/or hydrated sodium methylsilicate. Similarly, the lithium compound containing water of crystallization and the potassium-containing compound containing water of crystallization also may produce water after being dissolved.

Hereinafter, the effect of the concrete hardener composition of the present invention will be explained with Experimental Examples, wherein the components (including (A) sodium silicate compound, (B) acid compound, (C) solvent and (D) additive) of the concrete hardener composition in Experimental Example 1 to Experimental Example 8 are listed in Table 1.

TABLE 1

| Experimental Example | (A) content (wt %) | (B) content (wt %) | (C) content (wt %) | (D) content (wt %) | silicon content (wt %) | total water content (wt %) |
|---|---|---|---|---|---|---|
| 1 | anhydrous sodium metasilicate 45.75% | tartaric acid 13.33% | water 40.41% | sodium dodecyl sulfate 0.5% | 12% | 40.41% |
| 2 | sodium orthosilicate 23% | EDTA 8% | water 68.5% | sodium dodecyl sulfonate 0.5% | 4% | 68.5% |
| 3 | sodium metasilicate pentahydrate 39.75% | nitric acid 13.33% | water 17.99% | potassium silicate 28.93% | 12% | 34.87% |
| 4 | anhydrous sodium metasilicate 10.68% | boric acid 11.11% | water 32.38% glycerin 32.38% | lithium silicate 13.38% | 4% | 32.38% |
| 5 | sodium orthosilicate 32.05% | EDTA 1.33% | water 25.23% polyethylene glycol 31.33% | potassium methylsilicate (concentration: 40%) 9.9% | 6% | 31.33% |
| 6 | sodium metasilicate pentahydrate 35.78% | acetic acid 8% | water 28.97% ethylene glycol 17% | Sodium methylsilicate (concentration: 30%) 10.25% | 6% | 51.33% |
| 7 | anhydrous sodium metasilicate 38.13% | glycolic acid (concentration: 40%) 33.33% | water 28.34% | polyoxypropylene polyoxyethylene copolymer 0.2% | 10% | 48.34% |
| 8 | anhydrous sodium metasilicate 11.44% | acetic acid 3% glycolic acid (concentration: 40%) 33.33% EDTA 4% tartaric acid 2.5% nitric acid 2.5% | water 29.1% propylene glycol 15% | potassium silicate 7.23% lithium Silicate 2.53% potassium methylsilicate (concentration: 40%) 7.97% sodium methylsilicate (concentration: 30%) | 3.3% | 40.17% |

TABLE 1-continued

| Experimental Example | (A) content (wt %) | (B) content (wt %) | (C) content (wt %) | (D) content (wt %) | silicon content (wt %) | total water content (wt %) |
|---|---|---|---|---|---|---|
| | | boric acid 2.5% | | 5.13% nonylphenol polyoxyethylene ether sulfate sodium salt 0.1% | | |

Experimental Example 1

First, water (solvent) is added to a heating and stirring reaction tank with a reflux apparatus, and the temperature is gradually raised to 60° C. Next, anhydrous sodium metasilicate (sodium silicate compound) is slowly added to the reaction tank and all is dissolved. In the process, if the temperature is dropped below 50° C., stop adding, and then add again after the temperature is raised to 55° C. Then, stop heating, and tartaric acid (acid compound) is slowly added into the reaction tank and observe the temperature rise. When the temperature is raised too fast or the temperature exceeds 70° C., stop adding, and a cooling apparatus is used or a natural cooling method is used to reduce the temperature to below 65° C., then continue adding and confirm that all is dissolved. After that, sodium lauryl sulfate (additive, which is a surfactant) is slowly added and cooled to the normal temperature to prepare a concrete hardener.

Experimental Example 2

The concrete hardener is prepared in the same manner as in Experimental Example 1.

Experimental Example 3

Except that the additive (potassium silicate) is added before adding the acid compound and no surfactant is added, the concrete hardener is prepared in the same manner as in Experimental Example 1.

Experimental Example 4

Except that the additive (lithium silicate) is added before adding the acid compound, the solvent (glycerin) is added after adding the acid compound and no surfactant is added, the concrete hardener is prepared in the same manner as in Experimental Example 1.

Experimental Example 5

The concrete hardener is prepared in the same manner as in Experimental Example 4.

Experimental Example 6

The concrete hardener is prepared in the same manner as in Experimental Example 4.

Experimental Example 7

The concrete hardener is prepared in the same manner as in Experimental Example 1.

Experimental Example 8

Except that the additive is added before adding the acid compound and the solvent (propylene glycol) is added before adding the surfactant, the concrete hardener is prepared in the same manner as in Experimental Example 1.

Surface Hardness Test

<Preparation of Circular Concrete Substrates for Testing>

30 g of pure water is added to 90 g of commercially available three-in-one cement (KYS three-in-one non-shrinkage cement), and then stirred thoroughly and poured into a circular mold with a diameter of 9 cm. After 72 hours of complete curing, a circular concrete substrate with a diameter of 9 cm, a height of 0.9 cm and a weight of about 110 g is obtained. After that, a steel wool brush is used to clean the laitance on the concrete substrate and the concrete substrate is dried to obtain a test sample.

<Testing Method>

A smallest paint brush is used to dip the concrete hardener of Experimental Example 1 to Experimental Example 8 and a commercially available concrete hardener (PS-104, Concrete Sealer USA), and the concrete hardeners are applied on the surfaces of Test Sample 1 to Test Sample 9, respectively. After drying, the concrete hardeners are continued applying until the no concrete hardener is absorbed at the surface of the test sample. After standing for 12 hours, a grinder (CP Wheel non-woven abrasive wheel, manufactured by 3M) is used to contact the surface of the test sample for 60 seconds. After that, the test sample is washed with water and dried, and then the surface hardness of the test sample is measured with a Mohs hardness pen (Deluxe Mohs' Hardness Pick Set). The test results are shown in Table 2.

TABLE 2

| Test Sample | Concrete hardener | Surface hardness |
|---|---|---|
| 1 | Experimental Example 1 | 5 to 6 |
| 2 | Experimental Example 2 | 5 to 6 |
| 3 | Experimental Example 3 | 5 to 6 |
| 4 | Experimental Example 4 | 5 to 6 |
| 5 | Experimental Example 5 | 5 to 6 |
| 6 | Experimental Example 6 | 5 to 6 |
| 7 | Experimental Example 7 | 5 to 6 |
| 8 | Experimental Example 8 | 5 to 6 |
| 9 | PS-104 | 5 to 6 |
| 10 | — | 2 to 3 |

It can be seen from Table 2 that the results of the surface hardness test may meet the needs of current building materials when the surface of the concrete substrate is coated with the concrete hardener prepared in Experimental Example 1 to Experimental Example 8, respectively.

It will be apparent to those skilled in the art that various modifications and variations can be made to the disclosed embodiments without departing from the scope or spirit of the disclosure. In view of the foregoing, it is intended that the disclosure covers modifications and variations disposed that they fall within the scope of the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A concrete hardener composition, comprising:
   a sodium silicate compound, comprising sodium silicate or a mixture of sodium silicate and sodium methylsilicate;
   an acid compound, comprising acetic acid, glycolic acid, ethylenediaminetetraacetic acid, tartaric acid, nitric acid, boric acid or a combination thereof; and
   a balance amount of solvent, comprising water or a mixed solution of water and polyol,
   wherein the content of silicon is between 5 wt % and 15 wt % and the content of the acid compound is between 2 wt % and 30 wt % based on the total weight of the concrete hardener composition.

2. The concrete hardener composition of claim 1, wherein the content of the sodium methylsilicate is not more than 10 wt % based on the total weight of silicate in the concrete hardener composition.

3. The concrete hardener composition of claim 1, wherein the content of the solvent is between 30 wt % and 78 wt % based on the total weight of the concrete hardener composition.

4. The concrete hardener composition of claim 1, wherein the content of water is between 50 wt % and 100 wt % based on the total weight of the solvent.

5. The concrete hardener composition of claim 1, wherein the total water component in the concrete hardener composition comprises water of crystallization contained in the silicate in the concrete hardener composition.

6. The concrete hardener composition of claim 1, further comprising a lithium-containing compound, a potassium-containing compound or a combination thereof, wherein the content of lithium ions in the lithium-containing compound does not exceed 1 wt % and the content of potassium ions in the potassium-containing compound does not exceed 6 wt % based on the total weight of the concrete hardener composition.

7. The concrete hardener composition of claim 6, wherein the lithium-containing compound comprises lithium silicate, lithium carbonate, lithium hydroxide or a combination thereof.

8. The concrete hardener composition of claim 6, wherein the potassium-containing compound comprises potassium silicate, potassium methylsilicate, potassium carbonate, potassium hydroxide or a combination thereof.

9. The concrete hardener composition of claim 1, wherein the polyol comprises glycerin, ethylene glycol, propylene glycol, diethylene glycol, glycerol polyoxyethylene ether, polyethylene glycol or a combination thereof.

10. The concrete hardener composition of claim 1, further comprising a surfactant, wherein the content of the surfactant is not more than 0.5 wt % based on the total weight of the concrete hardener composition.

* * * * *